(12) United States Patent
Fernandez et al.

(10) Patent No.: US 12,717,640 B2
(45) Date of Patent: Aug. 25, 2026

(54) RENDERING WORKLOAD MANAGEMENT IN A MULTI-COMPUTING INFRASTRUCTURE ENVIRONMENT

(71) Applicant: Dell Products L.P., Round Rock, TX (US)

(72) Inventors: Pedro Fernandez, Shanghai (CN); Qing Ye, Hopkinton, MA (US); Zhisong Liu, Shenzhen (CN)

(73) Assignee: Dell Products L.P., Round Rock, TX (US)

(*) Notice: Subject to any disclaimer, the term of this patent is extended or adjusted under 35 U.S.C. 154(b) by 513 days.

(21) Appl. No.: 18/342,825

(22) Filed: Jun. 28, 2023

(65) Prior Publication Data

US 2025/0004849 A1 Jan. 2, 2025

(51) Int. Cl.
*G06F 12/00* (2006.01)
*G06F 9/50* (2006.01)

(52) U.S. Cl.
CPC .................................... *G06F 9/505* (2013.01)

(58) Field of Classification Search
CPC ....... G06F 9/505; G06F 9/5072; G06F 9/5077
USPC .......................................................... 711/105
See application file for complete search history.

(56) References Cited

U.S. PATENT DOCUMENTS

2021/0255902 A1* 8/2021 Soon-Shiong ........ G06F 9/5027

FOREIGN PATENT DOCUMENTS

CN 102592315 A * 7/2012
CN 105263050 A * 1/2016 ....... H04N 21/44012

OTHER PUBLICATIONS

M. Mos et al., "How to Use Online Render Farms," https://garagefarm.net/blog/how-to-use-online-render-farms, Accessed Mar. 22, 2023, 27 pages.
Dell Technologies, "APEX," https://www.delltechnologies.com/asset/en-my/solutions/apex/briefs-summaries/apex-brochure.pdf, Nov. 2022, 10 pages.

* cited by examiner

*Primary Examiner* — Mardochee Chery
(74) *Attorney, Agent, or Firm* — Ryan, Mason & Lewis, LLP

(57) ABSTRACT

Rendering workload management techniques in an information processing system are disclosed. For example, a method comprises obtaining one or more rendering workloads from a client, and automatically managing execution of the one or more rendering workloads in accordance with at least a subset of resources of a plurality of computing platforms, wherein the plurality of computing platforms comprises at least one client computing platform and at least one cloud computing platform.

20 Claims, 8 Drawing Sheets

RENDERING WORKLOAD MANAGEMENT IN A MULTI-COMPUTING INFRASTRUCTURE ENVIRONMENT

FIELD

The field relates generally to information processing systems, and more particularly to workload management in information processing systems.

BACKGROUND

Rendering is a computer-based process for creating an image, or a collection of images playable at a given frame rate, from two-dimensional (2D) and/or three-dimensional (3D) models. Such rendering is typically the final step in the process of visualization, which involves creating models of objects, texturing those objects, and adding lighting and/or other effects to the generated images and scenes (2D and/or 3D) as needed or otherwise desired to form a final product.

Rendering farms are specialized computing infrastructure environments (e.g., high performance computing (HPC) and/or cloud-based data centers) configured to optimize the rendering performance and to support 3D design, modeling and production of 3D works. Typically, rendering can be divided into two types of workloads: (i) pre-rendering or long duration rendering workloads, e.g., the rendering of a full-length motion picture, which can take months of constant computation; and (ii) short-lived rendering workloads that support design and modeling tools, which are comparatively shorter than pre-rendering or long duration rendering workloads.

Demand for rendering has significantly increased in recent years due a combination of factors such as, by way of example only, COVID and the corresponding remote work phenomena, a shift of the motion picture industry toward full computer-generated imagery (CGI)-based filming, the development of the metaverse, and economizing efforts by content creators where more and more creators are tapping into the efficiencies of 3D models and rendering. No less relevant to the increase in rendering needs is the usage of 3D rendering in various business and/or scientific areas such as, but not limited to, real estate, architecture, and life sciences. In fact, it is realized that 3D rendering is now a billion-dollar market with an estimated compound annual growth rate of approximately 24 percent.

However, managing this growth in rendering services is a significant challenge with respect to the computing infrastructure environments through which the services are provided.

SUMMARY

Illustrative embodiments provide rendering workload management techniques in an information processing system.

For example, in an illustrative embodiment, a method comprises the following steps. The method obtains one or more rendering workloads from a client, and automatically manages execution of the one or more rendering workloads in accordance with at least a subset of resources of a plurality of computing platforms, wherein the plurality of computing platforms comprises at least one client computing platform and at least one cloud computing platform.

In some illustrative embodiments, automatic rendering workload management may utilize one or more estimations to determine an execution plan for the one or more rendering workloads prior to execution. Further, in some illustrative embodiments, automatic rendering workload management may select and allocate the subset of resources of the plurality of computing platforms based on one or more criteria. Still further, in some illustrative embodiments, automatic rendering workload management may apply one or more security protocols in accordance with the execution of the one or more rendering workloads.

Additional illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments may comprise a multi-computing platform rendering workload management engine configured to provide a transparent and fully-managed rendering solution in a multi-computing infrastructure environment. The multi-computing infrastructure environment may comprise some combination of one or more client computing platforms, one or more public cloud computing platforms, and one or more private cloud computing platforms. In some illustrative embodiments, an entity that manages the multi-computing platform rendering workload management engine may also manage the cloud computing platforms, while a third-party entity manages at least another portion of the cloud computing platforms.

These and other illustrative embodiments include, without limitation, apparatus, systems, methods and computer program products comprising processor-readable storage media.

DETAILED DESCRIPTION

Figure 1:
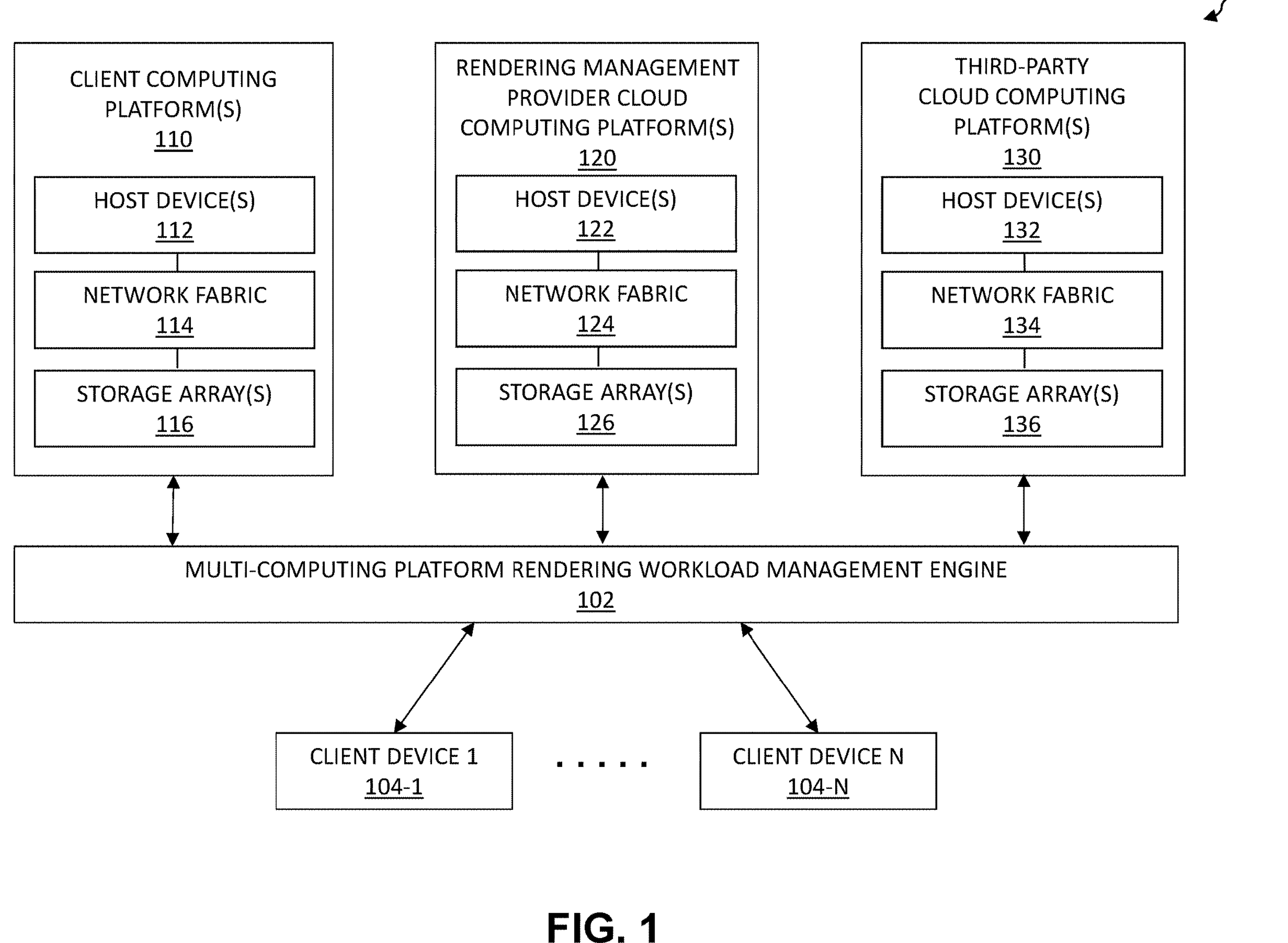
FIG. 1 illustrates an information processing system configured with multi-computing platform rendering workload management functionalities according to an illustrative embodiment.

As mentioned above, computing infrastructure environments that provide rendering services are sometimes referred to as rendering farms. Existing rendering farm offerings are typically dominated by cloud service providers. Cloud services can typically be provided as public cloud platforms or private cloud platforms. A public cloud platform is understood to include public cloud infrastructure such as, but not limited to, Amazon Web Services (AWS), Google Cloud Platform (GCP), Microsoft Azure, etc., wherein a public cloud provider (e.g., Amazon, Google, Microsoft) manages services for multiple enterprises (tenants) on the same computing infrastructure. However, some enterprises prefer to have a private cloud platform (e.g., not shared by multiple tenants) wherein the enterprise has access to the cloud platform for its exclusive use. Many of the above-mentioned public cloud providers also offer private cloud services for their customers. Some enterprises also choose to contract with one or more cloud providers to provide a combination of public and private cloud platforms.

Further, with respect to rendering, it is realized herein that many enterprises may have their own local computing infrastructure environments (i.e., residing at one or more locations managed by the enterprise or so-called on-premises computing infrastructure) in which some rendering workloads, or part of a rendering workload, can or should be executed. Yet, there is no existing rendering service solution that is capable of collectively managing local, public cloud, and private cloud rendering services so that an enterprise needs only to focus on its key performance indicator, i.e., the rendered product.

In addition, it is realized herein that rendering workloads are extremely susceptible to tight deadlines but are difficult to estimate beforehand. For example, industries such as filmmaking require rendering capabilities on a daily basis which is extremely challenging for estimating the rendering power needed before starting a project. As such, most filmmaking enterprises default to have their rendering occur, as much as possible, within the local computing infrastructure as, currently, the operational cost is much lower than with cloud solutions.

It is also realized herein that multi-cloud rendering solutions neglect the local computing infrastructure. Currently, while an enterprise may tap into cloud resources to address any processing gap with respect to rendering workload requirements caused by using only local resources, the enterprise must manually balance the work done locally versus work done on cloud-based resources. This can easily lead to problems of minimizing cost and adjusting to changing deadlines.

It is further realized herein that while local rendering is a preferred option for larger enterprises in the filmmaking industry, local rendering farms require a large investment in hardware and information technology (IT) management. For example, with respect to filmmaking enterprises, when demands spike for a high resolution, immersive viewing experience, capital and operating expenses do not favor a fully localized rendering. However, cloud rendering services do not provide a clear cost schema and costs far surpass the cost of local rendering. Costs tend to be unbalanced between local and cloud rendering, i.e., in some cases, the cost of a cloud setup that is fully utilized over several weeks can be more costly than the acquisition of the same setup locally. Still further, it is difficult to measure the cost of a project beforehand due the characteristics of rendering workloads, e.g., the resources used are highly correlated with the rendering configuration selected, which tends to be a decision made by a content designer.

Illustrative embodiments overcome the above and other technical drawbacks with existing rendering service approaches by providing a transparent and fully-managed rendering solution in a multi-computing infrastructure environment, i.e., some combination of one or more local computing platforms, one or more public cloud computing platforms, and one or more private cloud computing platforms. Such a transparent, fully-managed, multi-computing platform rendering service, according to illustrative embodiments, will be described below in the context of the illustrative figures.

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising various computing, networking, and storage systems, as well as other types of processing systems comprising various combinations of physical and virtual processing resources. An information processing system may therefore comprise, for example, at least one data center or other cloud-based system that includes one or more clouds each with multiple cloud resources, as well as on-premises resources as mentioned above. Resources can include, but are not limited to, hardware (e.g., storage devices, processing devices, memory devices, routers, switches, etc.), software, and/or combinations thereof. Different types of computing infrastructure environments are also encompassed by the term "information processing system" as that term is broadly used herein.

FIG. 1 shows an information processing system 100 configured with multi-computing platform rendering workload management functionalities in accordance with an illustrative embodiment. As shown, information processing system 100 comprises a multi-computing platform rendering workload management engine 102 operatively coupled to a plurality of client devices 104-1 . . . 104-N (referred to hereinafter collectively as client devices 104 or individually as client device 104). Client devices 104, in some embodiments, may be associated with one or more rendering service users associated with a given enterprise or an individual content creator. Note that, as illustratively referred to herein, the terms user, customer, enterprise, content creator and the like, may be used interchangeably.

As further shown, information processing system 100 comprises one or more client computing platforms 110 (referred to hereinafter collectively as client computing platforms 110 or individually as client computing platform 110) which, in some embodiments, may be considered as part of a local or on-premises computing infrastructure environment of the above-mentioned given enterprise or content creator. Each of the one or more client computing platforms 110, as depicted, may comprise one or more host devices 112 (e.g., graphics processing units (GPUs), central processing units (CPUs), application specific integrated circuits (ASICs), and/or the like), a network fabric 114 (e.g., switches, routers, and/or the like), and one or more storage arrays 116 (e.g., storage devices, memory devices, and/or the like), collectively referred to as resources of the client computing platforms 110. Such illustrative resources will be further described below.

As still further shown, information processing system 100 comprises one or more rendering management provider cloud computing platforms 120 (referred to hereinafter collectively rendering management provider cloud computing platforms 120 or individually as rendering management provider cloud computing platform 120). In some embodiments, each rendering management provider cloud computing platform 120 may be considered as part of a computing infrastructure environment provided by the same or associated entity (i.e., a rendering services provider) that provides the multi-computing platform rendering workload management engine 102. Each of the one or more rendering management provider cloud computing platforms 120, as depicted, may comprise one or more host devices 122 (e.g., GPUs, CPUs, ASICs, and/or the like), a network fabric 124 (e.g., switches, routers, and/or the like), and one or more storage arrays 126 (e.g., storage devices, memory devices, and/or the like), collectively referred to as resources of the rendering management provider cloud computing platforms 120. Such illustrative resources will be further described below. Further, in some embodiments, some of the rendering management provider cloud computing platforms 120 may be public type cloud computing platforms, while others may be private type cloud computing platforms.

Additionally as shown, information processing system 100 comprises one or more third-party cloud computing platforms 130 (referred to hereinafter collectively third-party cloud computing platforms 130 or individually as third-party cloud computing platform 130). In some embodiments, cach third-party cloud computing platform 130 may be considered as part of a computing infrastructure environment provided by an entity other than the given enterprise or the entity (i.e., a rendering services provider) that provides the multi-computing platform rendering workload management engine 102. Each of the one or more third-party cloud computing platforms 130, as depicted, may comprise one or more host devices 132 (e.g., GPUs, CPUs, ASICs, and/or the like), a network fabric 134 (e.g., switches, routers, and/or the like), and one or more storage arrays 136 (e.g., storage devices, memory devices, and/or the like), collectively referred to as resources of the third-party cloud computing platforms 130. Such illustrative resources will be further described below. Further, in some embodiments, some of the third-party cloud computing platforms 130 may be public type cloud computing platforms, while others may be private type cloud computing platforms.

As will be described in further detail herein, the multi-computing platform rendering workload management engine 102 enables a customer (e.g., enterprise) to have one or more rendering workloads transparently deployed for execution on resources from the one or more client computing platforms 110, resources from the one or more rendering management provider cloud computing platforms 120, and/or resources from the one or more third-party cloud computing platforms 130, with a determinable cost schema. Moreover, the multi-computing platform rendering workload management engine 102 fully manages the one or more rendering workloads by removing the need for the customer to have to make the decision on where to deploy a rendering workload since multi-computing platform rendering workload management engine 102 automatically decides where to deploy the workload for execution. The decision can be made based on one or more configurable metrics such as, but not limited to, execution time and execution cost. Further, multi-computing platform rendering workload management engine 102 automatically configures and manages (e.g., monitors and updates) the underlying local resources (e.g., resources from the one or more client computing platforms 110) and cloud resources (e.g., resources from the one or more rendering management provider cloud computing platforms 120 and the one or more third-party cloud computing platforms 130) of the various available computing platforms. Multi-computing platform rendering workload management engine 102 is further configured to also utilize load-balancing techniques when deciding on resource selection and allocation.

It is further realized herein that multi-computing platform rendering workload management engine 102 leverages the attributes of rendering workloads which tend to be long-lived, predictable, and relatively easy to partition, meaning that multi-computing platform rendering workload management engine 102 can stop and relocate a workload or divide it into smaller tasks (e.g., split a 120-frames rendering task into individual frames for processing).

In one non-limiting example, parts or all of rendering management provider cloud computing platforms 120 can be implemented in conjunction with an Infrastructure-as-a-Service (IaaS) solution such as one available from Dell Technologies Inc. called APEX™. In such an illustrative embodiment, multi-computing platform rendering workload management engine 102 is configured to adapt an laaS-based implementation in order to transparently manage resources (e.g., host devices, network fabric, and/or storage arrays as shown in FIG. 1) deployed at the client location, and/or provisioned elsewhere in one or more cloud computing platforms, that are configured to run rendering workloads. Multi-computing platform rendering workload management engine 102 is also configured to utilize the adapted IaaS-based implementation to automatically obtain resources available from third-party cloud computing platforms 130 as may be needed.

It is to be understood that the resources depicted in information processing system 100 (i.e., host devices 112/122/132, network fabrics 114/124/134, and storage arrays 116/126/136) are examples of resources that are transparently managed by multi-computing platform rendering workload management engine 102. Thus, one or more of computing platforms 110, 120, and 130, collectively referred to as a multi-computing infrastructure environment, may comprise other types of resources (e.g., hardware, software, etc.) other than those illustratively depicted in FIG. 1.

For example, at least a subset of the host devices 112/122/132 (hosts) may be implemented as respective virtual machines of a compute services platform or other type of processing platform. The hosts in such an arrangement illustratively provide compute services such as execution of one or more applications on behalf of one or more users. The term "user" herein is intended to be broadly construed so as to encompass numerous arrangements of human, hardware, software or firmware entities, as well as combinations of such entities. Compute and/or storage services may be provided for one or more users under an laaS model, although it is to be appreciated that numerous other cloud infrastructure arrangements could be used, e.g., a Platform-as-a-Service (PaaS) model and/or a Function-as-a-Service (FaaS) model.

By way of further example, at least a subset of network fabrics 114/124/134 (networks) may be implemented using multiple networks of different types to interconnect the various components of the information processing system 100. For example, the networks may comprise a portion of a global computer network such as the Internet, although other types of networks can be part of the networks, including a wide area network (WAN), a local area network (LAN), a satellite network, a telephone or cable network, a cellular network, a wireless network such as a WiFi or WiMAX network, or various portions or combinations of these and other types of networks. The networks, in some embodiments, comprise combinations of multiple different types of networks each comprising processing devices configured to communicate using Internet Protocol (IP) and/or other types of communication protocols. As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel (FC). Numerous alternative networking arrangements are possible in a given embodiment, as will be appreciated by those skilled in the art. Although illustratively shown as separate from the networks in the figure, at least portions of storage arrays 116/126/136 (storage arrays) may be considered part of the networks in some embodiments. For example, in embodiments in which the networks comprise at least one storage area network (SAN), the storage arrays may be viewed as part of the one or more SANs.

Further, storage devices of the storage arrays may illustratively comprise solid state drives (SSDs). Such SSDs in some embodiments are implemented using non-volatile memory (NVM) devices such as flash memory. Other types of NVM devices that can be used to implement at least a portion of the storage devices include non-volatile random-access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays may illustratively comprise one or more VNX®, VMAX®, Unity™, PowerMax™, PowerStore™ and PowerScale™ storage arrays, as well as other commercially available storage arrays from Dell Technologies Inc.

As another example, one or more storage arrays may comprise respective clustered storage systems, each including a plurality of storage nodes interconnected by one or more networks. An example of a clustered storage system of this type is an XtremIO™ storage array from Dell Technologies Inc. illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices and the storage arrays within information processing system 100 may utilize PCIe connections or other types of connections implemented over one or more of the networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

As is apparent from the foregoing, terms such as "storage array" and "storage system" as used herein are intended to be broadly construed, and a given such storage array or storage system may encompass, for example, multiple distinct instances of a commercially-available storage array.

The storage devices of the storage arrays are configured to store data utilized by one or more applications running on one or more of the host devices. The storage devices on one of the storage arrays can be illustratively arranged in one or more storage pools. The storage arrays and their corresponding storage devices are examples of what are more generally referred to herein as "storage systems." A given such storage system in the present embodiment may be shared by the host devices, and in such arrangements may be referred to as a "shared storage system."

Processing devices in host devices, in some embodiments, are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices and the storage arrays may be implemented on respective distinct processing platforms, although numerous other arrangements are possible. For example, in some embodiments at least portions of the host devices and the storage arrays are implemented on the same processing platform. The storage arrays can therefore be implemented at least in part within at least one processing platform that implements at least a subset of the host devices.

The term "processing platform" as used herein is intended to be broadly construed so as to encompass, by way of illustration and without limitation, multiple sets of processing devices and associated storage systems that are configured to communicate over one or more networks. For example, distributed implementations of the host devices are possible, in which certain ones of the host devices reside in one data center in a first geographic location while other ones of the host devices reside in one or more other data centers in one or more other geographic locations that are potentially remote from the first geographic location. Thus, it is possible in some implementations of information processing system 100 for different ones of the host devices to reside in different data centers than the storage arrays. The storage arrays can be similarly distributed across multiple data centers.

It should also be understood that the particular sets of components implemented in information processing system 100 as illustrated in FIG. 1 are presented by way of example only. In other embodiments, only subsets of these components, or additional or alternative sets of components, may be used, and such components may exhibit alternative functionality and configurations.

Particular processing operations and other system functionality described herein are presented by way of illustrative example only and should not be construed as limiting the scope of the disclosure in any way. Alternative embodiments can use other types of processing operations involving host devices, networks, and storage systems.

Figure 2:
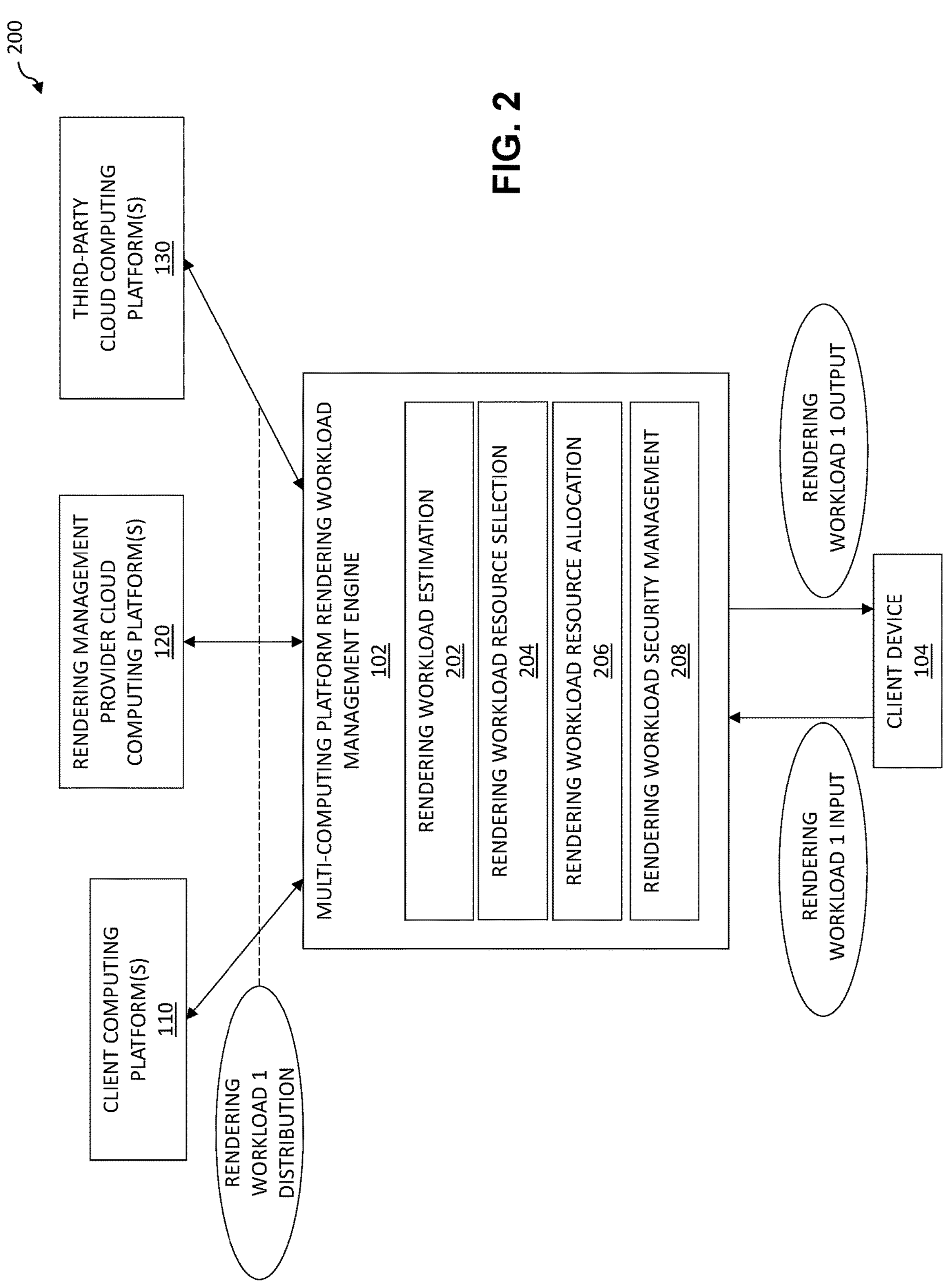
FIG. 2 illustrates a process flow for a multi-computing platform rendering workload management engine according to an illustrative embodiment.

Turning now to FIG. 2, a process flow 200 for multi-computing platform rendering workload management engine 102 is depicted according to an illustrative embodiment. More particularly, as shown, multi-computing platform rendering workload management engine 102 comprises a rendering workload estimation module 202, a rendering workload resource selection module 204, a rendering workload resource allocation module 206, and a rendering workload security management module 208.

While various functionalities of multi-computing platform rendering workload management engine 102 are shown in FIG. 2 as separate modules, it is to be appreciated that, in alternative embodiments, one or more functionalities may be combined with one or more other functionalities in one module. Likewise, any given functionality shown in FIG. 2 can be implemented in more than one module. Still further, it is to be appreciated that FIG. 2 illustrates some of the main functionalities of multi-computing platform rendering workload management engine 102 and that other functionalities that are described herein, but not expressly shown in FIG. 2, can be part of multi-computing platform rendering workload management engine 102.

Thus, as shown, the modules operate to enable client device 104 (e.g., associated with user, customer, enterprise) to provide a rendering workload, e.g., rendering workload 1 input, to multi-computing platform rendering workload management engine 102 which then automatically and transparently decides on how to distribute (e.g., select and allocate) the processing of rendering workload 1 among the resources of client computing platforms 110, rendering management provider cloud computing platforms 120, and/or third-party cloud computing platforms 130. Once rendering workload 1 is processed by the selected and allocated resources, multi-computing platform rendering workload management engine 102 returns rendering workload results, e.g., rendering workload 1 output, to client device 104. Multi-computing platform rendering workload management engine 102 is also enabled to provide a selectable level of encryption or other security mechanisms to provide for a secure environment in which the rendering workload is processed. The functionalities of each of rendering workload estimation module 202, rendering workload resource selection module 204, rendering workload resource allocation module 206, and rendering workload security management module 208 and their interactions will be described in further detail below.

Figure 3:
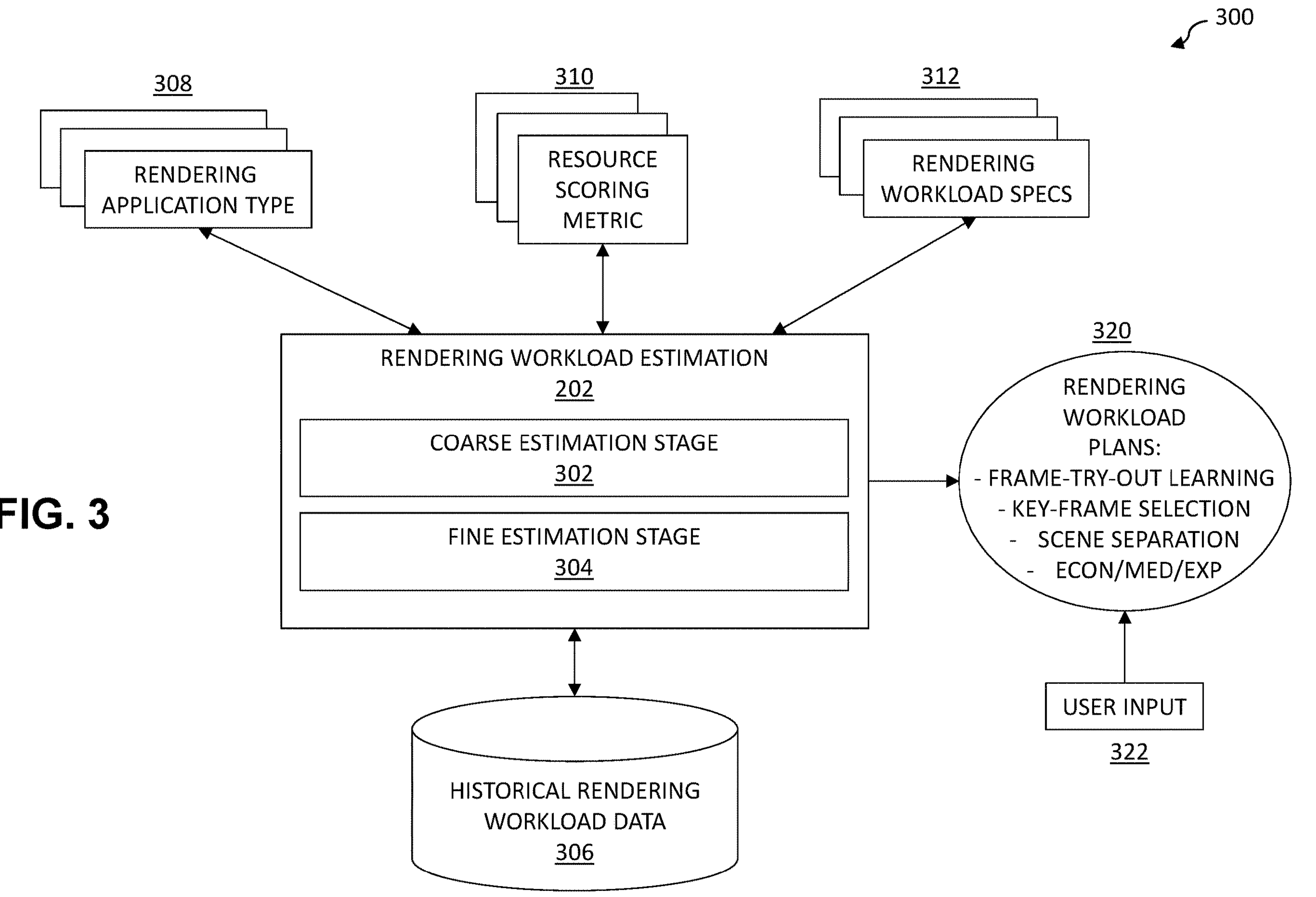
FIG. 3 illustrates a process flow for rendering workload estimation according to an illustrative embodiment.

As mentioned above, existing cost estimation of a rendering task tends to be difficult to perform accurately since it is typically done by enterprises in a manual and piecemeal manner. As such, as illustrated in a process flow 300 in FIG. 3, rendering workload estimation module 202 of multi-computing platform rendering workload management engine 102 is configured to automate the estimation operation by providing a coarse estimation stage 302 and a fine estimation stage 304.

For example, in one embodiment, the first time a rendering workload is executed, coarse estimation stage 302 runs a few frames of the workload to understand the average computational expenses per frame (which is typically a well-defined metric for rendering) on local resources (client computing platforms 110) and on cloud resources (rendering management provider cloud computing platforms 120 and/or third-party cloud computing platforms 130). Following coarse estimation stage 302, fine estimation stage 304 is run on the full rendering workload.

It is to be appreciated that long-lived workloads tend to be fairly uniform once the rendering configuration is settled. By way of example, for a film production, a workload can be run momentarily to understand the expected output, and then run for months uninterruptedly to generate the end product/film/video.

Results of the cost estimations run by coarse estimation stage 302 and a fine estimation stage 304 can be stored in a historical rendering workload data store 306. As will be further explained below, each cost estimate result is based on a number of factors, e.g., rendering application types 308, resource scoring metrics 310, and rendering workload specifications (specs) 312. Accordingly, based on data in historical rendering workload data store 306, rendering workload estimation module 202 is configured to provide a cost/time-bounded estimate for a future rendering workload. It is to be appreciated that rendering workload estimation module 202 can gather historical data on past rendering works from a customer/every customer depending on data privacy settings. The historical data may contain the rendering configuration (e.g., rendering application type 308 used and specific settings of the rendering application), scene metrics (e.g., the rendering time gets affected by the complexity/elements involved in a rendering scene as defined in rendering workload specs 312), and hardware utilized (e.g., GPU or CPU models, RAM and other resources used which can be defined by resource scoring metrics 310).

Multi-computing platform rendering workload management engine 102 enables a user to choose different 3D software based on their development platform, software version and rendering engine (depends on 3D software support). For example, a user (via client device 104) can select one of the rendering application types 308. The user can also select the resources to be used for rendering operations based on resource scoring metric 310. In one example, a GPU can be selected based on GPU scores available from OctaneBench™, e.g., a unit computation score for different types of GPU. Then, rendering workload specs 312 (e.g., number of frames, rendering resolution, rendering deadline, etc.) can be used with the GPU score (resource scoring metric 310) and the rendering application type 308 to offer different customization plans with different cost estimates, i.e., rendering workload plans 320. As will be illustratively explained below, user input 322 (e.g., from one or more client devices 104 and/or other appropriate users) can be used to modify rendering workload plans 320 generated by rendering workload estimation module 202.

In one illustrative embodiment, rendering workload estimation module 202 provides rendering workload plans 320 which are flexible and customized for users to determine the level of rendering cost (e.g., economical (ECON), medium (MED), expensive (EXP)). Different costs will lead to different rendering qualities. Rendering workload plans 320 may also include a variety of rendering features. By way of example only, such rendering features may comprise:

(i) Frame-try-out learning, where rendering workload estimation module 202 allows users to select one or a few frames for rendering try-out from which a detailed rendering estimation, including rendering quality, time and cost, is obtained. The users can choose the rendering plan based on their budgets.

(ii) Key-frame selection, where rendering workload estimation module 202 provides frame-by-frame customization. That is, the users can choose the most representative key frames for high-quality (slow) rendering and the rest of frames for medium-quality or low-quality (fast) rendering. Frame interpolation for high frames-per-second (FPS) rates. This is a technique useful for collaboration, where the user wants a key frame with the end-product/final-result quality, and the rest of the frames in a lower quality to center on the animation side. Additionally or alternatively, rendering workload estimation module 202 can be configured to provide automatic region/frame of interest detection. In further embodiments, the user can further select regions/frames or trim down (e.g., via user input 322) the selection made by rendering workload estimation module 202.

(iii) Scene separation, where rendering workload estimation module 202 provides a deep learning-based scene recognition process. For videos and images with different contents, rendering workload estimation module 202 provides a segmentation map to parse the scenes. The user can choose high-quality rendering for regions of interests and low-quality rendering for background and non-interesting regions.

For key-frame selection and scene separation, rendering workload estimation module 202 provides parallel rendering settings that assign the high-quality rendering task to GPUs and low-quality rendering task to CPUs. Rendering workload estimation module 202 can also assign different GPU resources to different rendering tasks for different levels of rendering detail. This flexible customization can maximize choices for users so that they can have different levels of cost estimation.

Accordingly, based on the rendering workload plan and features that the user chooses through rendering workload estimation module 202, rendering workload resource selection module 204 then automatically selects the local resources from client computing platforms 110 and/or cloud resources from rendering management provider cloud computing platforms 120 and/or third-party cloud computing platforms 130 that achieve the user selected plan and features.

Rendering workload resource allocation module 206 then automatically allocates (e.g., provisions, deploys, etc.) the selected resources to effectuate the plan and features. By way of example only, rendering workload resource allocation module 206 can allocate a rendering workload to multiple GPUs based on the user's budget, rendering quality and other requirements to best optimize the GPU resources.

Figure 4:
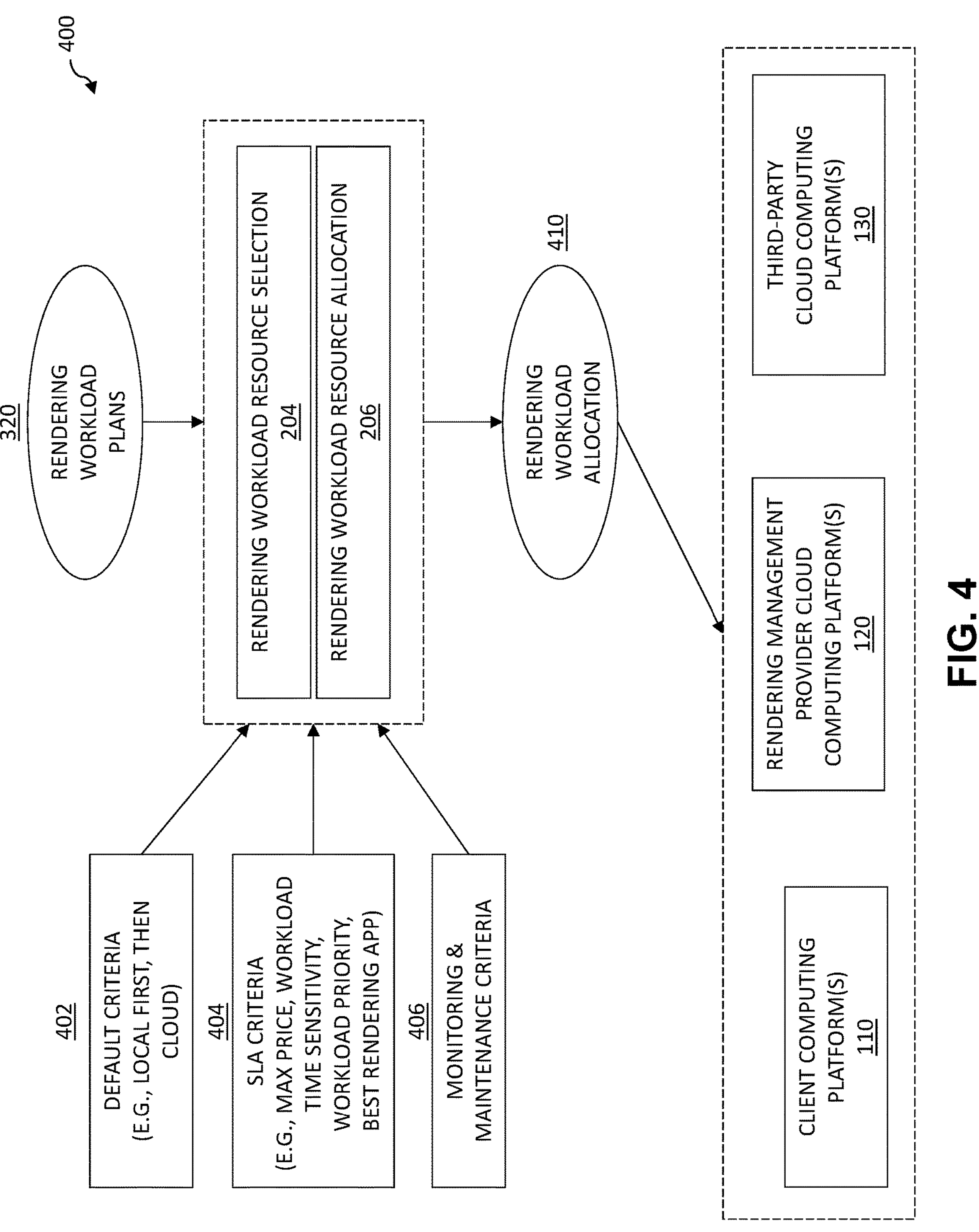
FIG. 4 illustrates a process flow for rendering workload resource selection and allocation according to an illustrative embodiment.

In illustrative embodiments, rendering workload resource selection module 204 and rendering workload resource allocation module 206 can apply various criteria in selecting and allocating resources, as shown in a process flow 400 in FIG. 4.

For example, rendering workload resource selection module 204 and rendering workload resource allocation module 206 may respectively consider default criteria 402 in the selection and allocation processes. For example, one default criterion 402 may be to select local rendering and thus allocate local resources by default. For example, computing resources and buffer resources deployed locally are selected first to execute the plan identified via rendering workload estimation module 202 (e.g., the user selects an economical plan from rendering workload plans 320).

Further, when no local cloud resources are available, rendering workload resource allocation module 206 may respectively select and allocate cloud resources for the rendering operation. In such scenarios, the user is enabled to define the maximum number of resources redirected to cloud services based on different SLA criteria 404 such as, by way of example only: (i) maximum price per period of time; (ii) workload time sensitivity (deadline to finish workload); (iii) workload priority; and (iv) best (or preferred) rendering application, rendering tools, 3D design tools and versions, etc.

Still further, rendering workload resource selection module 204 and rendering workload resource allocation module 206 may respectively consider monitoring and maintenance criteria 406 which collectively monitor and maintain local and cloud resources with respect to equipment health and/or other conditions. For example, local and cloud resources are monitored and maintained automatically and/or under the control of the rendering management provider (e.g., provider of multi-computing platform rendering workload management engine 102) using IaaS-related tools and services such as ones available for cloud offerings, thereby releasing the monitoring and maintenance burdens from the user. Note that in existing rendering services, maintenance of the local equipment is left to the customer and there is no end-to-end system (resources of computing platforms 110/120/130) monitoring and maintenance.

In some embodiments, the default cloud service is provided by rendering management provider cloud computing platforms 120. This cloud default criterion (e.g., part of default criteria 402) changes when the user actively selects another cloud computing platform, i.e., one of third-party cloud computing platforms 130. Some cloud computing platforms provide full integration of monitoring and redirecting of resources (e.g., AWS has application programming interfaces for this purpose), while others may utilize user set up.

It is to be understood that selection by rendering workload resource selection module 204 and allocation by rendering workload resource allocation module 206 also encompass re-selection and re-allocation, respectively, when appropriate based on one or more of criteria 402 through 406 and/or other factors. Thus, rendering workload allocation 410 can represent an initial resource allocation and/or a resource re-allocation.

Accordingly, based on estimates computed by rendering workload estimation module 202 as illustratively explained above, rendering workload resource selection module 204 and allocation by rendering workload resource allocation module 206 collectively manage the placement of new rendering workloads on resources of client computing platforms 110, rendering management provider cloud computing platforms 120, and third-party cloud computing platforms 130. In one non-limiting scenario, based on some predetermined criteria, placement occurs on local resources before tapping into cloud resources. However, rendering workload resource selection module 204 and allocation by rendering workload resource allocation module 206 account for the deadline/priority of each rendering task (e.g., SLA criteria 404). Rendering workloads can typically be defined as:

(i) Visualization/real-time rendering workloads: this type of rendering focuses on the support of design and 3D modeling tools where the rendering happens in real-time while a designer is using a tool. This type of workload is short-lived, and less predictable in the duration and uniformity of resources used.

(ii) Post-rendering workloads: this type of rendering is to generate a final product, and is usually long lasting (e.g., weeks to months of duration), and has uniform usage of resources. Also, these rendering workload types are easier to start/stop and relocate as their minimum unit of work tends to be frames or sections of frames, which make them more easily scalable and parallelizable.

So based on resources used, and duration and deadline/time sensitivity, rendering workload resource selection module 204 and rendering workload resource allocation module 206 will dynamically (e.g., automatically and in real-time) select/allocate and re-select/re-allocate workloads from the pool of local resources and cloud resources.

Figure 5:
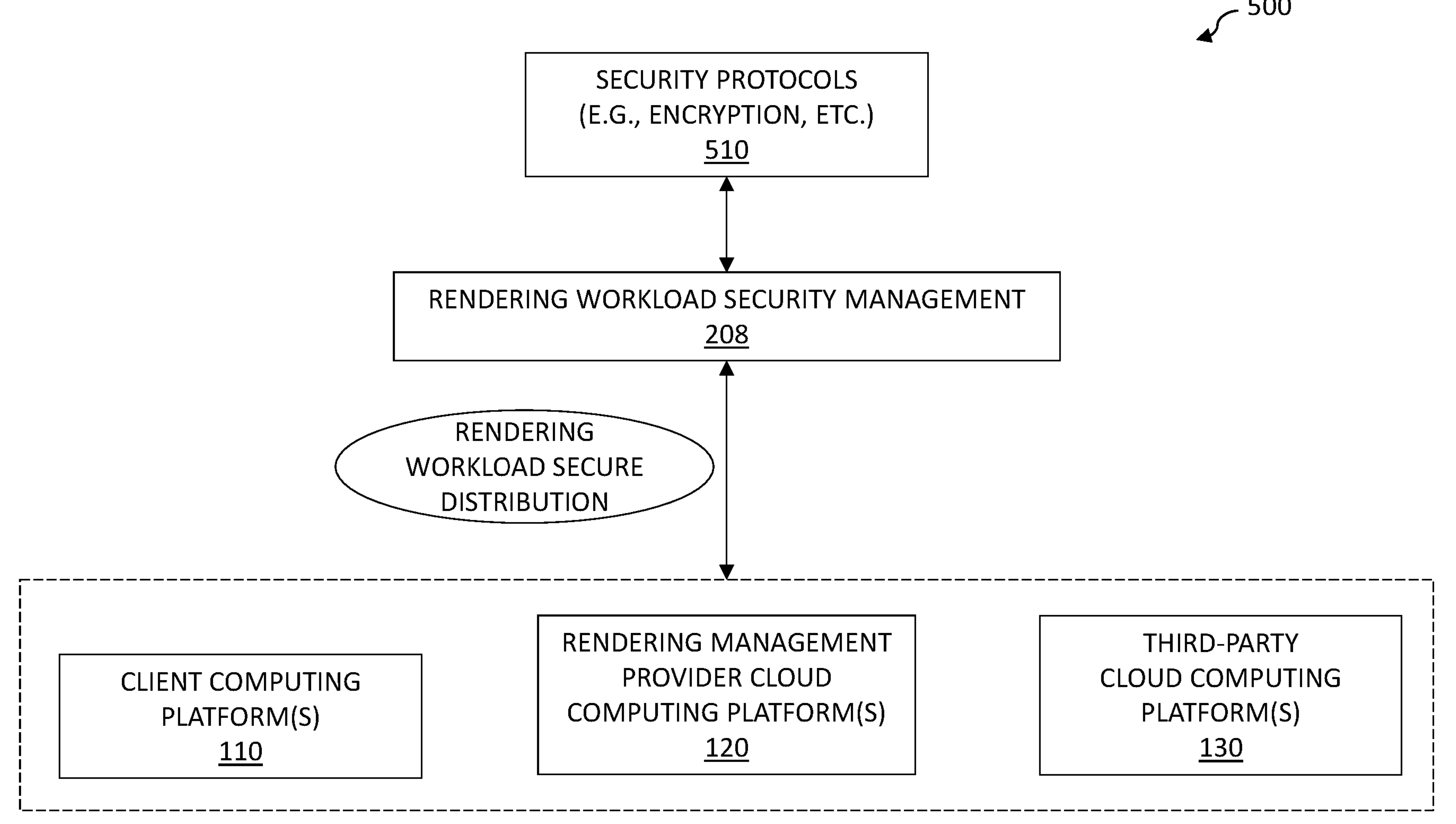
FIG. 5 illustrates a process flow for rendering workload security management according to an illustrative embodiment.

In illustrative embodiments, rendering workload security management module 208 can apply various security criteria, as shown in a process flow 500 in FIG. 5. As shown, rendering workload security management module 208 selects (based on user preference or automatic default criteria) one or more security protocols 510 to be applied to rendering workloads before they are distributed to resources for execution (e.g., cloud resources but also local resources if security is desired even on local computing platforms). By way of one example, an encryption protocol may be applied to a rendering workload so as to provide for secure distribution of the rendering workload.

Advantageously, since even partial content leaks could impact content creators (e.g., filmmaking industry), security measures such as, by way of example only, AES-256 encryption and/or and ISO/27001 information security, may be applied. If time, cost, and resources are not necessarily constraining factors, content creators (users, clients, customers) may prefer to have their content data encrypted at the highest available level, at all data states (e.g., data-at-rest, data-in-transit, data-in-use), to ensure their data is secure during rendering operations. However, multi-computing platform rendering workload management engine 102 enables a user to select a desired encryption level with estimated latency impact, and cost impact, to balance the content protection against other enterprise needs.

In one non-limiting use case, multi-computing platform rendering workload management engine 102 prioritizes workloads at local resources first (e.g., client computing platforms 110) to minimize cost and eliminate risk of malicious access. When local resources reach full capacity, the overflow workloads go to rendering management provider cloud resources (e.g., rendering management provider cloud computing platforms 120). Since, in some embodiments, the rendering management provider manages multi-computing platform rendering workload management engine 102 and rendering management provider cloud computing platforms 120, a user can choose a top tier SLA that guarantees the physical isolation of virtual GPU (vGPU) and virtual CPU (vCPU) for content of the user. When third-party cloud resources (e.g., third-party cloud computing platforms 130) are desired or otherwise selected by multi-computing platform rendering workload management engine 102, workloads are reassigned to keep the most critical content in the rendering management provider cloud and release the less prioritized workloads to the third-party cloud to minimize risk. With multi-tiered SLA, the user can pick the encryption protocols and states according to their budget and/or project timeline, i.e., higher levels of encryption require more compute and storage resources and take more time. Advantageously, multi-computing platform rendering workload management engine 102 provides a transparent rendering service platform that allows users to tailor the encryption level based on content sensitivity, budget, and timeline.

Figures 6A, 6B:
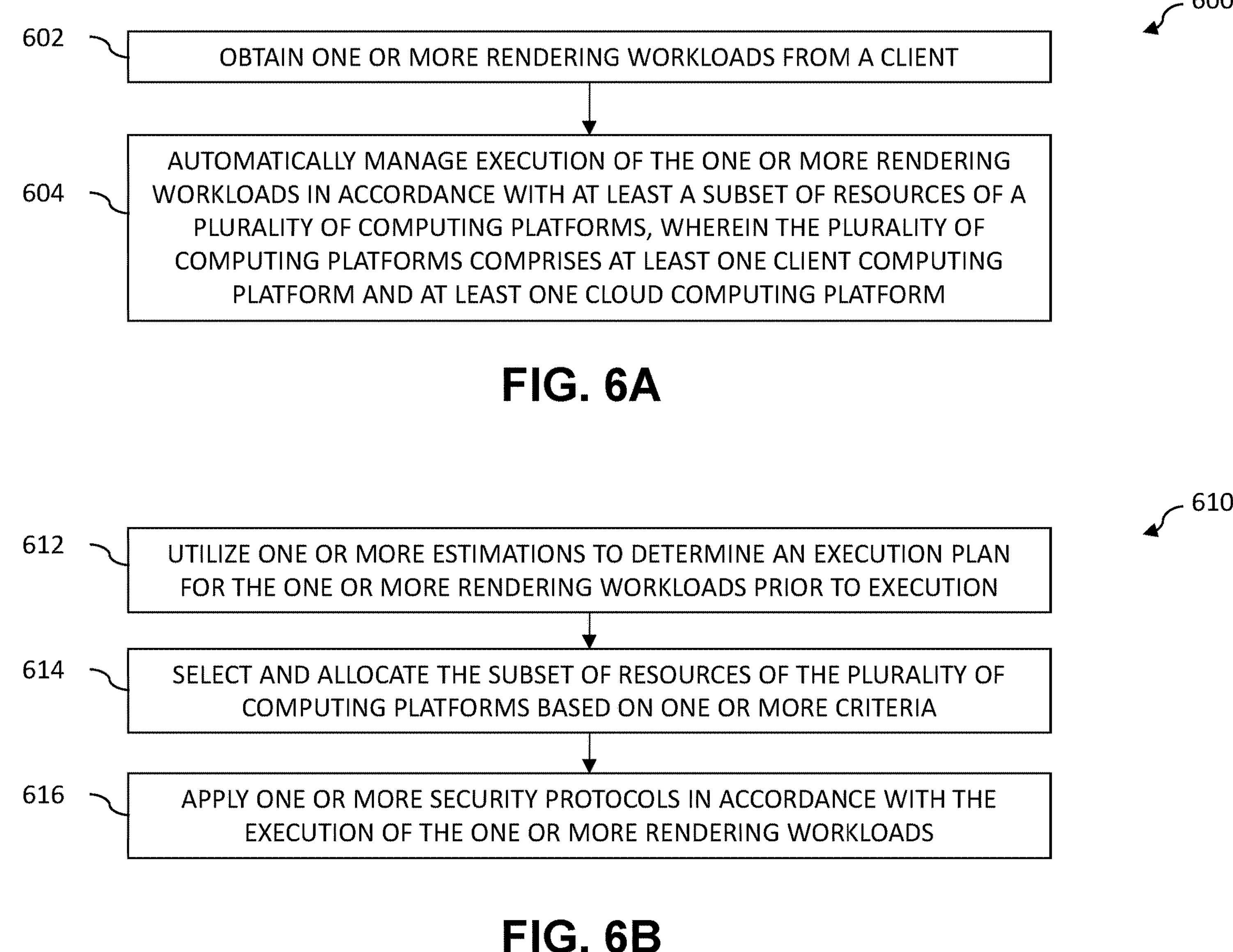
FIGS. 6A and 6B illustrate a multi-computing platform rendering workload management methodology according to an illustrative embodiment.

FIG. 6A illustrates a multi-computing platform rendering workload management methodology 600 according to an illustrative embodiment. In one or more illustrative embodiments, multi-computing platform rendering workload management engine 102 is configured to execute methodology 600. As shown, step 602 obtains one or more rendering workloads from a client. Step 604 automatically manages execution of the one or more rendering workloads in accordance with at least a subset of resources of a plurality of computing platforms, wherein the plurality of computing platforms comprises at least one client computing platform and at least one cloud computing platform.

FIG. 6B illustrates a methodology 610 that comprises steps of the automatic rendering workload management of step 604 of FIG. 6A. As shown, step 612 utilizes one or more estimations to determine an execution plan for the one or more rendering workloads prior to execution. Step 614 selects and allocates the subset of resources of the plurality of computing platforms based on one or more criteria. Step 616 applies one or more security protocols in accordance with the execution of the one or more rendering workloads.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for multi-computing platform rendering workload management will now be described in greater detail with reference to FIGS. 7 and 8. Although described in the context of information processing system 100, these platforms may also be used to implement at least portions of other information processing systems in other embodiments.

Figure 7:
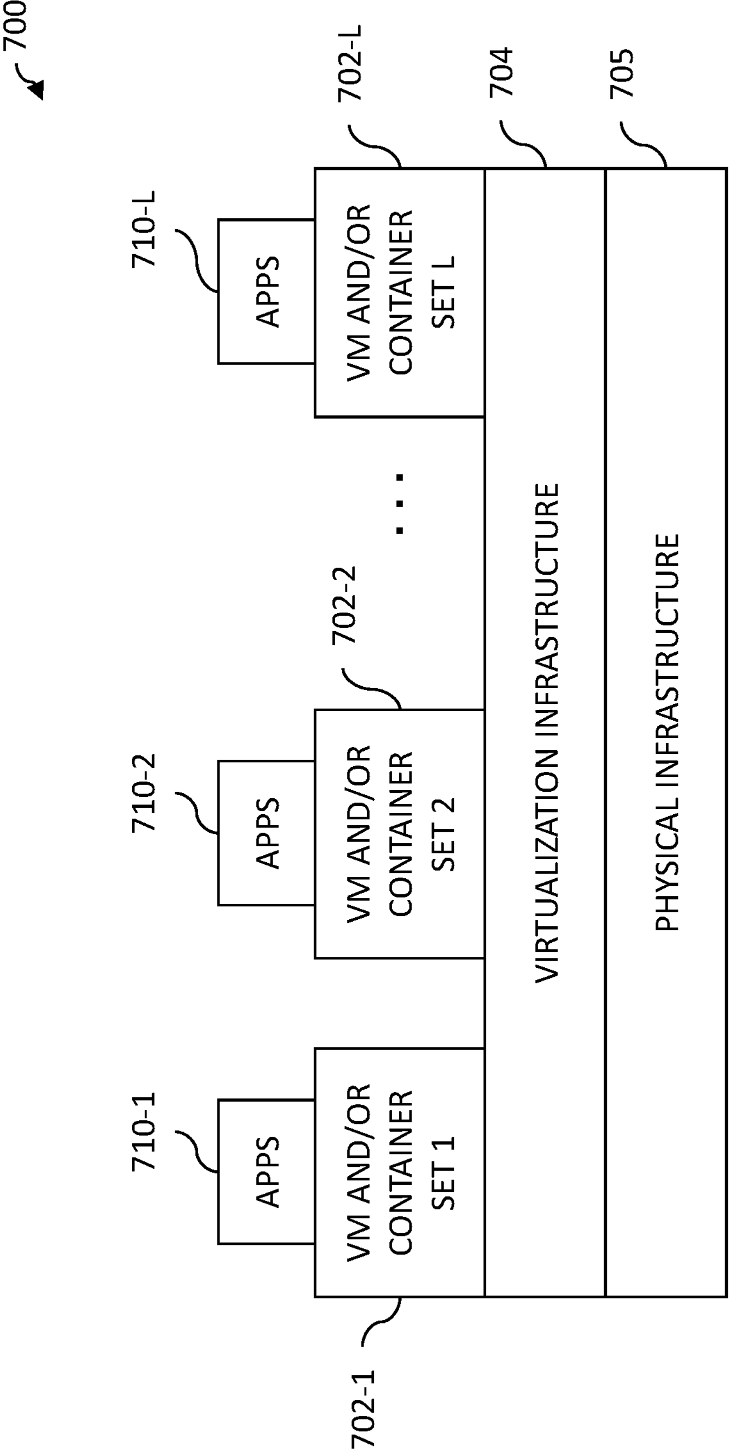
FIGS. 7 and 8 illustrate examples of processing platforms that may be utilized to implement at least a portion of an information processing system in illustrative embodiments.
Figure 8:
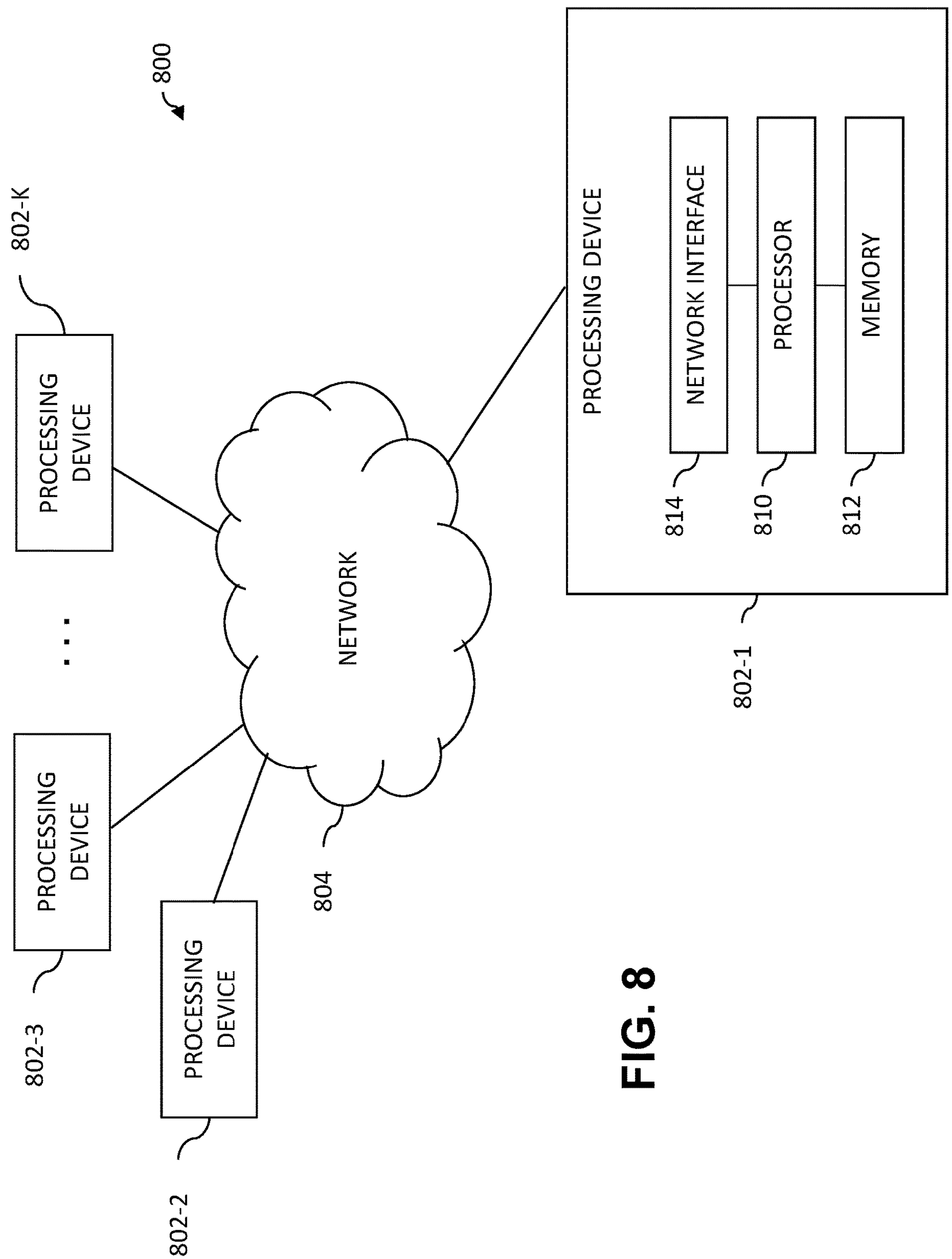

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2 . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2 . . . 710-L running on respective ones of the VMs/container sets 702-1, 702-2 . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of information processing system 100 and includes a plurality of processing devices, denoted 802-1, 802-2, 802-3 . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for intelligent data simulation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, databases, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory, the at least one processing device, when executing program code, is configured to:

obtain one or more rendering workloads from a client; and automatically manage execution of the one or more rendering workloads in accordance with at least a subset of resources of a plurality of computing platforms, wherein the plurality of computing platforms comprises at least one client computing platform and at least one cloud computing platform, and wherein the automatically managing execution of the one or more rendering workloads further comprises utilizing one or more estimations to determine an execution plan for the one or more rendering workloads prior to execution.

2. The apparatus of claim 1, wherein the at least one processing device, when executing program code, is further configured to:

compute the one or more estimations based on historical rendering workload data.

3. The apparatus of claim 1, wherein the at least one processing device, when executing program code, is further configured to:

compute the one or more estimations using at least one of a coarse estimation stage and a fine estimation stage based on one or more of a rendering application type, a resource scoring metric, and one or more specifications associated with the one or more rendering workloads.

4. The apparatus of claim 1, wherein the execution plan comprises one or more of a frame rendering try-out feature, a key frame selection feature, and a scene separation feature.

5. The apparatus of claim 1, wherein the execution plan comprises a plurality of execution levels based on an attribute computed for the one or more estimations.

6. The apparatus of claim 1, wherein the at least one processing device, when automatically managing execution of the one or more rendering workloads, is further configured to:

select and allocate the subset of resources of the plurality of computing platforms based on one or more criteria.

7. The apparatus of claim 6, wherein the one or more criteria comprise one or more default criteria.

8. The apparatus of claim 7, wherein one of the one or more default criteria comprises a criterion to select and allocate, when available or otherwise appropriate, resources of the at least one client computing platform.

9. The apparatus of claim 7, wherein one of the one or more default criteria comprises a criterion to select and allocate, when available or otherwise appropriate, resources of a private cloud portion of the at least one cloud computing platform.

10. The apparatus of claim 6, wherein the one or more criteria comprise one or more service level-based criteria.

11. The apparatus of claim 10, wherein the one or more service level-based criteria comprise at least one of a time sensitivity criterion, a workload priority criterion, a rendering application criterion, and a cost criterion.

12. The apparatus of claim 6, wherein the one or more criteria comprise one or more monitoring and maintenance criteria associated with monitoring and maintenance of the resources of the plurality of computing platforms.

13. The apparatus of claim 1, wherein the at least one processing device, when automatically managing execution of the one or more rendering workloads is further configured to:

apply one or more security protocols in accordance with the execution of the one or more rendering workloads.

14. The apparatus of claim 13, wherein the one or more security protocols comprise an encryption protocol, wherein the encryption protocol is applied to at least a portion of the one or more rendering workloads.

15. A method comprising:

obtaining one or more rendering workloads from a client; and automatically managing execution of the one or more rendering workloads in accordance with at least a subset of resources of a plurality of computing platforms, wherein the plurality of computing platforms comprises at least one client computing platform and at least one cloud computing platform, and wherein the automatically managing execution of the one or more rendering workloads further comprises utilizing one or more estimations to determine an execution plan for the one or more rendering workloads prior to execution;

wherein the method is performed by at least one processing device comprising a processor coupled to a memory.

16. The method of claim 15, wherein automatically managing execution of the one or more rendering workloads further comprises:

selecting and allocating the subset of resources of the plurality of computing platforms based on one or more criteria.

17. The method of claim 15, wherein automatically managing execution of the one or more rendering workloads further comprises:

applying one or more security protocols in accordance with the execution of the one or more rendering workloads.

18. A computer program product comprising a non-transitory processor-readable storage medium having stored therein program code of one or more software programs, wherein the program code when executed by at least one processing device cause the at least one processing device to:

obtain one or more rendering workloads from a client; and automatically manage execution of the one or more rendering workloads in accordance with at least a subset of resources of a plurality of computing platforms, wherein the plurality of computing platforms comprises at least one client computing platform and at least one cloud computing platform, and wherein the automatically managing execution of the one or more rendering workloads further comprises utilizing one or more estimations to determine an execution plan for the one or more rendering workloads prior to execution.

19. The computer program product of claim 18, wherein the execution plan comprises one or more of a frame rendering try-out feature, a key frame selection feature, and a scene separation feature.

20. The computer program product of claim 18, wherein the execution plan comprises a plurality of execution levels based on an attribute computed for the one or more estimations.

* * * * *